M. J. FITZGERALD.
GLARE PROTECTOR.
APPLICATION FILED SEPT. 27, 1915.
1,228,545.
Patented June 5, 1917.
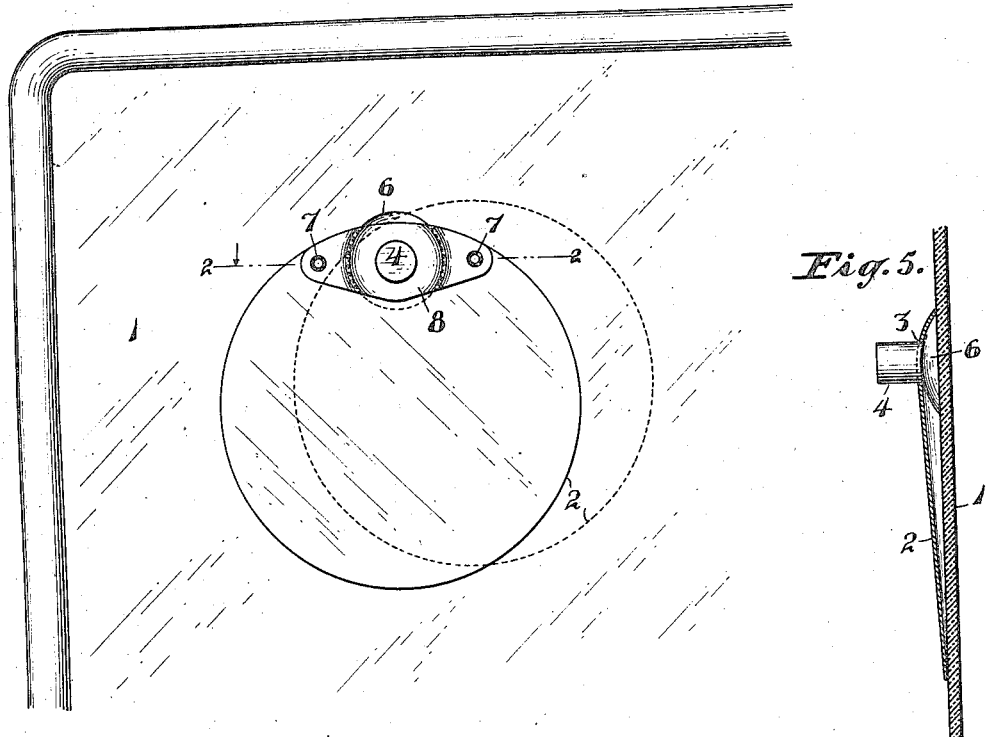
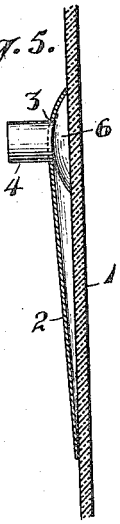
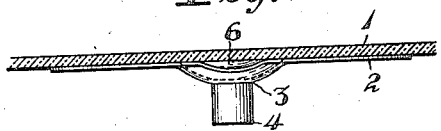
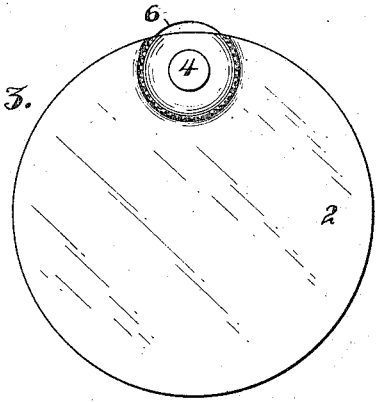
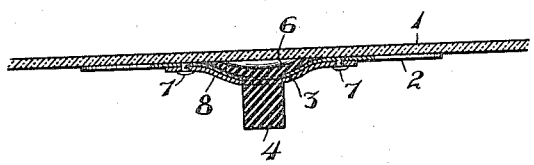
Inventor,
M. J. Fitzgerald,
By Francis M. Wright,
Attorney

UNITED STATES PATENT OFFICE.

MICHAEL J. FITZGERALD, OF RICHMOND, CALIFORNIA.

GLARE-PROTECTOR.

1,228,545.

Specification of Letters Patent. Patented June 5, 1917.

Application filed September 27, 1915. Serial No. 52,838.

*To all whom it may concern:*

Be it known that I, MICHAEL J. FITZGERALD, a citizen of the United States, residing at Richmond, in the county of Contra Costa and State of California, have invented new and useful Improvements in Glare-Protectors, of which the following is a specification.

Persons driving automobiles or street cars and meeting another automobile or street car at night time experience great difficulty in looking ahead owing to the glare of the concentrated rays from the head light of the approaching automobile or car.

It has heretofore been attempted to overcome this difficulty by attaching an opaque screen to the metal edge or frame of the wind shield of the automobile. In many cases, as in street cars, for instance, such a device can not be used at all, and, when used with automobiles, it requires that the wind shield should be lowered below the face of the driver in order that the glare protector may be used. It was therefore necessary for the driver either to endure the inconvenience of not being protected from the wind or rain, if he wished to be protected from the glare of an approaching light, or to endure the inconvenience of not being protected from said glare, if he wished to be protected from the weather. Since the former inconvenience is greater and more continuous than the latter, the consequence was that the glare protector was little, if ever, used.

One object of the present invention is to provide a glare protector which can be used, not only on automobiles which have a wind shield with a free edge, but also on those which have an entirely closed glass front, and also on street cars, and, when the automobile has an open wind shield, can also be used without taking down the upper portion of the wind shield, and behind or in front of the lower portion thereof, and with a wind shield which is at or above the level of the face of the driver.

A further object of the invention is to provide such a glare protector of very cheap and simple construction, and which, after being attached to the wind shield, can be adjusted to various positions to accommodate itself to the line of vision of the driver of the vehicle, and furthermore, one edge of which will be as close as possible to the wind shield.

In the accompanying drawing, Figure 1 is a broken rear view of a wind shield showing my improved glare protector attached thereto; Fig. 2 is a broken vertical section of the same on the line 2—2 of Fig. 1; Fig. 3 is a modified form of glare protector; Fig. 4 is a plan of the same attached to a wind shield shown in section; Fig. 5 is a vertical section of a modified form of the invention.

Referring to the drawing, 1 indicates a wind shield of ordinary construction. 2 indicates the main portion of my improved glare protector which is made of colored celluloid or other more or less opaque sheet material. Near one edge is a round hole 3 through which extends the cylindrical shank 4 of a rubber suction cup 6, said shank and suction cup being formed all in one piece. The hole 3 is very slightly less than the diameter of the shank of the suction cup and said shank must be forcibly compressed to force it entirely through said hole 3 in which position it is firmly retained. However, since the hole 3 and the shank 4 are both perfectly round, the protector can easily be turned upon the shank to any desired position, so as to adjust the glare protector to the line of vision of the driver of the vehicle.

A further improvement consists in providing means whereby the edge of the glare protector is in contact with the glass of the wind shield. This I may do in several ways, of which I here show three. One way is to secure to the glare protector, by rivets 7, a metal holder 8 having a round hole through which the shank of the suction cup extends, and so formed as to press the edge of the glare protector against the glass of the wind shield. In another form of the invention, shown in Figs. 3 and 4 the metal holder is dispensed with and the glare protector is so shaped that it fits closely around the suction cup. The cavity is here shown as being coextensive with the suction cup, the remainder of the glare protector being flat. In Fig. 5 the whole of the glare protector is concave to the wind shield and the edge of the glare protector is in contact with the wind shield throughout its whole extent.

The mode of use of the device and the advantages thereof will be apparent from the foregoing description.

I claim:—

1. In combination, a glare protector having a hole eccentric thereto, and a rubber suction cup provided with means extending through said hole for securing the glare protector to the cup in various adjusted positions without moving the cup.

2. In combination, a rubber suction cup having a round rubber shank, and adapted to be pressed by suction against a surface, and a glare protector having therethrough an eccentrically located round hole through which said shank extends with a tight fit.

3. In combination, a rubber suction cup having a round shank and adapted to be pressed by suction against a surface, a glare protector having therethrough an eccentrically located round hole through which said shank extends, and an apertured plate through which said shank also extends and pressing the edge of the glare protector against said surface.

In testimony whereof I have hereunto set my hand in the presence of two subscribing witnesses.

MICHAEL J. FITZGERALD.

Witnesses:
F. M. WRIGHT,
D. B. RICHARDS.